United States Patent
Stone et al.

(10) Patent No.: US 10,934,190 B2
(45) Date of Patent: Mar. 2, 2021

(54) WATER TREATMENT PROCESSES UTILIZING SEQUENTIAL ADDITION OF A BASE AND AN OXIDANT

(71) Applicant: Halliburton Energy Services, Inc., Houston, TX (US)

(72) Inventors: Shantel J. Stone, Conroe, TX (US); Charles R. Landis, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 37 days.

(21) Appl. No.: 15/525,938

(22) PCT Filed: Dec. 12, 2014

(86) PCT No.: PCT/US2014/070084
§ 371 (c)(1),
(2) Date: May 10, 2017

(87) PCT Pub. No.: WO2016/093864
PCT Pub. Date: Jun. 16, 2016

(65) Prior Publication Data
US 2019/0023592 A1    Jan. 24, 2019

(51) Int. Cl.
| | | |
|---|---|---|
| C02F 1/52 | (2006.01) | |
| C02F 1/66 | (2006.01) | |
| C02F 1/76 | (2006.01) | |
| C02F 103/10 | (2006.01) | |
| C02F 1/463 | (2006.01) | |
| C02F 101/20 | (2006.01) | |

(52) U.S. Cl.
CPC .............. *C02F 1/66* (2013.01); *C02F 1/463* (2013.01); *C02F 1/52* (2013.01); *C02F 1/76* (2013.01); *C02F 2101/203* (2013.01); *C02F 2101/206* (2013.01); *C02F 2103/10* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,197,201 B1* | 3/2001 | Misra | ..................... | C02F 1/5236 210/721 |
| 2003/0121864 A1* | 7/2003 | Kin | ..................... | B03D 1/1437 210/724 |
| 2005/0070752 A1* | 3/2005 | Kojima | ..................... | C02F 1/02 588/320 |
| 2007/0045189 A1* | 3/2007 | Lichtner | .............. | B01D 61/025 210/652 |
| 2008/0023397 A1* | 1/2008 | Clifford | .................. | C02F 11/04 210/614 |
| 2009/0120881 A1 | 5/2009 | Fanday | | |
| 2009/0173638 A1 | 7/2009 | Powell et al. | | |
| 2013/0075335 A1* | 3/2013 | Prakash | ............... | B01D 61/364 210/640 |
| 2013/0161262 A1* | 6/2013 | Henley | ..................... | C02F 9/00 210/695 |
| 2013/0313199 A1 | 11/2013 | Margin et al. | | |
| 2015/0377816 A1* | 12/2015 | Wan | ....................... | G01N 27/07 204/406 |

FOREIGN PATENT DOCUMENTS

| | | |
|---|---|---|
| CN | 103663779 A | 3/2014 |
| JP | 2002-233882 A | 8/2002 |
| JP | 3595826 B2 | 12/2004 |
| KR | 10-2000-0000456 A | 1/2000 |
| KR | 10-2003-0061828 A | 7/2003 |

OTHER PUBLICATIONS

JP20022002233882 Machine Translation—Espacenet machine translation—Hirata, Suehide—Aug. 20, 2002 (Year: 2002).*
International Search Report and Written Opinion dated Jul. 27, 2015 in PCT Application No. PCT/US2014/070084.

\* cited by examiner

*Primary Examiner* — Bradley R Spies
(74) *Attorney, Agent, or Firm* — Tenley Krueger; C. Tumey Law Group PLLC

(57) ABSTRACT

When treating an aqueous stream containing metal ions, the pH is often raised to remove at least a portion of the metal ions. The presence of a multiplicity of metal ions with interfering chemistries and/or varying concentrations can make the pH rise difficult to predict for a given amount of base. Accordingly, water treatment processes can comprise: providing an acidic aqueous stream comprising one or more metal ions; adding a base to the aqueous stream and increasing its pH to a first pH value; after adding the base and increasing the pH, adding an alkaline source of hypochlorous acid to the aqueous stream and further increasing its pH to a second pH value, the second pH value being about 7 or above; and removing at least a portion of the metal ions from the aqueous stream after adding the base and the alkaline source of hypochlorous acid.

20 Claims, No Drawings

WATER TREATMENT PROCESSES UTILIZING SEQUENTIAL ADDITION OF A BASE AND AN OXIDANT

BACKGROUND

The present disclosure generally relates to water treatment processes, and, more specifically, to methods for more reliably attaining a pH rise during water treatment processes.

Various treatment processes are used in order to prepare wastewater streams for recycling, further purification or discharge back into a natural water source or another natural environment. Illustrative wastewater treatment processes can remove organic compounds, metal ions, bacteria or other biologics, and the like.

Metal ion-containing wastewater streams are produced in a variety of commercial processes. Wastewater streams produced in the mining industry, for example, can be highly acidic and contain a gamut of heavy metal toxins that need to be removed before the wastewater can be discharged.

Metal ions can be particularly difficult to remove during wastewater treatment processes due to the wide variety of chemistries exhibited by various metal ions. Metal ion chemistry is oftentimes made even more complex by the presence of multiple metal oxidation states that frequently exhibit vastly different chemical properties from one another. Moreover, when a multiplicity of metal ions in varying oxidation states is present in an aqueous stream, particularly an acidic aqueous stream, the metal ion chemistry can quickly become exceedingly complex, and it can be difficult to predict the outcome of a given water treatment process. For example, it can become difficult to predict the outcome of pH changes in the aqueous stream.

The solubility of some metal ions decreases as the pH rises in an aqueous stream, in which case the metal ions may precipitate as a flocculated metal salt. Accordingly, many water purification processes are predicated upon raising an aqueous stream's pH. In order to mitigate the occurrence of multiple oxidation states for a given metal ion, it is also common to introduce an oxidant to the aqueous stream in order to remove low-valence oxidation states. The substantial elimination of multiple oxidation states for a given metal ion can address, at least to some degree, one factor leading to the complex metal ion chemistry. Easier removal of certain metal ions following adjustment of their oxidation state can also be realized.

Hypochlorous acid is a commonly used oxidant in water treatment processes. For oxidants such as hypochlorous acid, the aqueous stream pH is an important parameter for achieving a successful treatment. Due to a solution equilibrium between aqueous chlorine gas and an acidic solution of hypochlorous acid (i.e., $Cl_2 + H_2O \leftrightarrow HClO + HCl$), the pH of hypochlorous acid solutions is usually maintained at alkaline levels in order to drive the equilibrium to the right by neutralizing hydrochloric acid. For instance, commercial bleach is supplied as an alkaline solution of sodium hypochlorite in order to prevent the formation of chlorine gas under acidic conditions. For similar reasons, it can be desirable to maintain an alkaline pH when using aqueous sodium hypochlorite as a source of hypochlorous acid for treating an aqueous stream. Without maintaining the treatment pH at a sufficiently alkaline level, dangerous chlorine gas may be generated and there may not be enough oxidant present to effectively oxidize the metal ions present in the aqueous stream.

DETAILED DESCRIPTION

The present disclosure generally relates to water treatment processes, and, more specifically, to methods for more reliably attaining a pH rise during water treatment processes.

One or more illustrative embodiments incorporating the features of the present disclosure are presented herein. Not all features of a physical implementation are necessarily described or shown in this application for the sake of clarity. It is to be understood that in the development of a physical implementation incorporating the embodiments of the present disclosure, numerous implementation-specific decisions may be made to achieve the developer's goals, such as compliance with system-related, business-related, government-related and other constraints, which may vary by implementation and from time to time. While a developer's efforts might be time-consuming, such efforts would be, nevertheless, a routine undertaking for one having ordinary skill in the art and the benefit of this disclosure.

As discussed above, the treatment of aqueous streams containing a multiplicity of metal ions can be complicated by a number of factors, including interfering chemistries and multiple oxidation states for some metal ions. Adjustment of the pH and/or oxidation processes can be used in various water treatment processes to affect at least partial removal of metal ions from an aqueous stream. However, the complicated chemical environment of aqueous streams having a multiplicity of interfering metal ions can make it difficult to predict how a particular treatment process will proceed. The specific metal ions present in a given aqueous stream, their oxidation states, and their amounts can lead to wide variability in how they interact with each other and with treatment chemicals used in conducting a treatment process.

The water purification industry is highly regulated, and water treatment processes are well documented as part of environmental best practices and right to know regulations. When both pH control and oxidation state regulation are required in the course of treating an aqueous stream, presently used water treatment processes use a concurrent or near-concurrent addition of base and oxidant to affect a simultaneous pH increase and oxidation state change. Such concurrent addition operations are believed to be due to historical practices and a desire to minimize the number of process steps. In this regard, quicklime (calcium oxide) and/or slaked lime (calcium hydroxide) are commonly added concurrently with aqueous sodium hypochlorite in order to affect removal of metal ions in the form of a flocculated metal salt precipitate. Generally, excess quantities of both materials are added in order to ensure that the pH is raised to a sufficient degree and that a sufficient quantity of oxidant is present.

In the course of investigating presently used water treatment processes, the present inventors discovered that a concurrent addition of excess base and oxidant is inefficient for a number of reasons. Even though lime bases and alkaline sodium hypochlorite solutions are relatively inexpensive chemicals, the use of excess materials still represents an unnecessary cost and an undesirable environmental concern, especially for large scale operations. Moreover, while attempting to lower the excess amount of lime base used during presently used concurrent addition processes for treating an aqueous stream, the inventors discovered that the pH rise is less than expected and may not even reach the alkalinity needed to maintain the oxidant, retard the formation of chlorine gas, and precipitate metal ions to a target concentration.

Without being bound by any theory or mechanism, the inventors believe that a concurrent addition of lime base and hypochlorous acid oxidant produces an undesirably small pH change for a couple of reasons. First, hypochlorous acid is a weak acid and produces modestly basic, buffered solutions in the presence of a strong base, such as calcium hydroxide. Because a concurrent addition of lime base and aqueous sodium hypochlorite necessarily produces a buffer solution, the change to more alkaline pH values is resisted, at least until excess base is added to exceed the buffer capacity. Moreover, because of the resistance to attaining higher alkaline pH values, the hypochlorous acid equilibrium can shift toward the formation of aqueous chlorine gas, thereby decreasing the quantity of available oxidant. In addition, interfering chemistries from a multiplicity of metal ions can add a further degree of complication. These combined effects can be particularly problematic when treating acidic aqueous streams containing metal ions, such as those produced in the mining industry. As discussed above, excesses of both lime base and hypochlorous acid oxidant may be necessary in order to ensure that a sufficient quantity of the oxidant is present in order to attain a more readily precipitatable oxidation state for at least a portion of the metal ions.

In contrast to concurrent addition processes, the present inventors surprisingly discovered that if a base is added first to an acidic aqueous stream containing metal ions, and an oxidant, specifically an alkaline source of hypochlorous acid, is added afterward, a much more reliable pH increase and a higher peak pH can be obtained for a given amount of base. The more reliable pH behavior is desirable and advantageous for a number of reasons. Foremost, it allows lower amounts of chemicals to be used during water treatment processes, thereby decreasing costs and increasing environmental favorability. Furthermore, it can decrease variability when treating aqueous streams containing a multiplicity of metal ions and their possible interfering chemistries with each other, the base and/or the oxidant. Finally, because the processes of the present disclosure can more reliably attain an alkaline pH, they can enhance process safety and oxidation reliability by lessening the risk of chlorine gas formation and maintaining sufficient hypochlorous acid oxidant in solution to facilitate oxidation. By maintaining sufficient hypochlorous acid oxidant, the valence state of metal ions may be adjusted such that they are more likely to precipitate as flocculated metal salts in order to affect purification.

More specifically, the inventors discovered that a higher peak pH can be attained by first adding a lime base to an acidic aqueous stream, followed thereafter by an alkaline sodium hypochlorite solution, as compared to the peak pH obtained when these chemicals are added either simultaneously or in the reverse order. In practice, the lime base is added to the acidic aqueous stream, and after a delay period, the alkaline sodium hypochlorite solution is then added. During the delay period, the pH rises from its initial value and approaches a plateau value. The delay period may be pre-determined such that the alkaline sodium hypochlorite solution is added once the plateau value has been reached or approached, although it need not necessarily be added at the pH plateau. Some degree of improved pH reliability can be achieved when the alkaline sodium hypochlorite solution is added at any point in time after the lime base has been added. However, addition of the alkaline sodium hypochlorite solution at or near the pH plateau can provide better stabilization of the hypochlorous acid oxidant for the reasons noted above.

In various embodiments, precipitative water purification processes are described herein. As used herein, the term "precipitative water purification" refers to removal of one or more contaminants from a water source by forming an insoluble species. The contaminant(s) themselves can be the insoluble species, such as a flocculated metal salt, or the insoluble species can carry other contaminants from the water source through physical and/or chemical entrainment. When one or more metal ions are removed during purification, the process is referred to as "precipitative water softening." Specific details are provided hereinafter.

In some embodiments, the water treatment processes can comprise: providing an acidic aqueous stream comprising one or more metal ions; adding a base to the aqueous stream and increasing its pH to a first pH value; after adding the base and increasing the pH, adding an alkaline source of hypochlorous acid to the aqueous stream and further increasing its pH to a second pH value, the second pH value being about 7 or above; and removing at least a portion of the metal ions from the aqueous stream after adding the base and the alkaline source of hypochlorous acid.

As indicated above, the water treatment processes of the present disclosure involve adding a base to an acidic aqueous stream and at a time thereafter, adding an alkaline source of hypochlorous acid. In some embodiments, the alkaline source of hypochlorous acid may be added immediately after the base. In other embodiments, the alkaline source of hypochlorous acid may be added after a delay time of at least about 1 minute after the base, or at least about 2 minutes after the base, or at least about 3 minutes after the base, or at least about 4 minutes after the base, or at least about 5 minutes after the base, or at least about 6 minutes after the base, or at least about 7 minutes after the base, or at least about 8 minutes after the base, or at least about 9 minutes after the base, or at least about 10 minutes after the base. These delay times are residence times that may be chosen for a specific water chemistry to maximize the benefit of the first pH value before adding the alkaline source of hypochlorous acid, which may involve allowing the first pH value to reach or approach a plateau value. Other considerations for selecting the delay time may include, for example, allowing thermal equilibration to occur, and process- or equipment-related delays arising from adding the base and the alkaline source of hypochlorous acid separately and in sequence with one another.

Further to the above, in more specific embodiments, the processes of the present disclosure may further comprise allowing a pH rate of change to stabilize to a value of about 0.1 pH units or less per minute before the alkaline source of hypochlorous acid is added to the aqueous stream. As a pH adjusting agent is added to a fluid, the pH of that fluid changes over time. Generally, the rate of change in the pH will at first be rapid and the rate of change will then slow as the fluid pH approaches equilibrium at a final pH following the addition. In some embodiments, the pH rate of change may be allowed to reach or approach a plateau value after adding the base to the acidic aqueous stream. Adding the alkaline source of hypochlorous acid at or near a plateau pH value can better stabilize the oxidant once it has been added to the aqueous stream. In more particular embodiments, the pH rate of change can be allowed to stabilize to a value of about 0.05 pH units or less per minute before the alkaline source of hypochlorous acid is added to the aqueous stream.

The second pH value may be chosen to promote precipitation of one or more flocculated metal salts from the aqueous stream once the base and the alkaline source of hypochlorous acid have been added. Optionally, at least a portion of the metal ions in the aqueous stream may be oxidized before forming a flocculated metal salt, which also includes a Lewis acid-base complex flocculated material. The ionic form of the flocculated metal salts may include, for example, hydroxides, carbonates, the like, and any combination thereof. Other ionic forms of flocculated metal salts may also be suitable. Depending on the particular metal ions and their ionic forms, the flocculated metal salts may precipitate over a range of different pH values. The second pH value may be chosen to be sufficient to precipitate all of the flocculated metal salts or only some of the flocculated metal salts. In particular embodiments, the second pH value may be about 7.5 or above, or about 7.75 or above, or about 8 or above, or about 8.2 or above. For example, in an acidic aqueous stream containing manganese ions, copper, zinc and/or nickel ions may be targeted for removal at a pH of about 7.5 or above. A pH value of about 8.2 or above may be desirable in order to achieve more complete metal ion precipitation. In further embodiments, a maximum pH for the second pH value may be at most about 12, or at most about 11.5, or at most about 11, or at most about 10.5, or at most about 10, or at most about 9.5, or at most about 9.

The aqueous stream may be static or flowing when practicing the embodiments of the present disclosure. Additionally, the base and the alkaline source of hypochlorous acid may be added to the aqueous stream at the same location or in different locations. For example, for same location addition of the base and the alkaline source of hypochlorous acid, both reagents may be supplied from the same inlet. When the aqueous stream is flowing during treatment, the alkaline source of hypochlorous acid may be added to the aqueous stream downstream of the location where the base is added. Optionally, there may be a pH probe located downstream from the location where the base is added and before the location where the alkaline source of hypochlorous acid is added. This can ensure that a suitable pH rise has occurred before adding the alkaline source of hypochlorous acid. Further optionally, the flow rate of the aqueous stream or the addition location for the alkaline source of hypochlorous acid can be varied in order to provide a sufficient degree of temporal separation from the base addition.

As indicated above, the water treatment processes of the present disclosure may further comprise oxidizing at least a portion of the metal ions in the aqueous stream. The oxidizing may take place at or below the second pH value using hypochlorous acid in order to form oxidized metal ions. In further embodiments, the water treatment processes may further comprise precipitating the oxidized metal ions as a flocculated metal salt, and separating the flocculated metal salt from the aqueous stream. Metal ions that may be oxidized according to the processes of the present disclosure include those that have multiple oxidation states in solution, such as iron and manganese, for example. Oxidation may be desirable for forming an oxidation state that is more amenable toward precipitation of a flocculated metal salt and/or to reduce chemical variability or interference of multiple oxidation states. Oxidation may also be desirable for degrading organic matter in the aqueous stream, inactivating or degrading biologics in the aqueous stream, or any combination thereof.

Although at least a portion of the metal ions in the aqueous stream may be oxidized in the processes of the present disclosure, it is to be emphasized that not all of the metal ions necessarily undergo oxidation in order to form a flocculated metal salt. For example, the only common solution oxidation state for aluminum is +3, and aluminum ions need not undergo oxidation in order to form a flocculated metal salt. Accordingly, processes of the present disclosure may also comprise precipitating at least a portion of the metal ions in the aqueous stream as a flocculated metal salt, and separating the flocculated metal salt from the aqueous stream.

Separating the flocculated metal salt from the aqueous stream can occur using a variety of processes and equipment including, for example, gravity settling and decantation, membrane filtration, cross-flow filtration, centrifugation, hydrocyclones, and any combination thereof. Cross-flow filtration and hydrocyclone separation, in particular, can be especially amenable for use in continuous purification processes where the aqueous stream remains flowing during treatment.

After removal of one or more flocculated metal salts from the aqueous stream, the aqueous stream may be further purified, if needed, in order to additionally decrease the content of metal ions. Suitable fine purification processes that may be conducted following separation of flocculated metal salts from the aqueous stream include, for example, ultrafiltration, nanofiltration, reverse osmosis filtration, or any combination thereof.

The acidic aqueous stream may also be further purified prior to adding the base and the alkaline source of hypochlorous acid. For example, suspended solids initially present in the aqueous stream may be removed before adjusting the pH and adding the alkaline source of hypochlorous acid. In this regard, illustrative suspended solids may include, for example, insoluble inorganic materials, and biologics. Suitable separation techniques include those discussed above for separating a flocculated metal salt.

In other various embodiments, purification processes of the present disclosure may further comprise subjecting the acidic aqueous stream to an electrocoagulation process before adding the base and the alkaline source of hypochlorous acid. The electrocoagulation process may comprise applying a current to the acidic aqueous stream. Illustrative functions of the electrocoagulation process may include, for example, de-emulsification, removal of suspended materials, initial oxidation of metal ions, and destructive removal of biologics. Illustrative electrocoagulation processes and equipment will be familiar to one having ordinary skill in the art, such as the CLEANWAVE™ system and treatment offered by Halliburton Energy Services.

The acidic aqueous streams being treated in the processes of the present disclosure can contain one or more metal ions, and more typically contain a multiplicity of metal ions of varying oxidation states and chemistries. In illustrative embodiments, the acidic aqueous stream may comprise about 5 or more metal ions, or about 10 or more metal ions, or about 15 or more metal ions, or about 20 or more metal ions, or about 25 or more metal ions, or about 30 or more metal ions, or about 35 or more metal ions, or about 40 or more metal ions, or about 45 or more metal ions, or about 50 or more metal ions. Aqueous streams containing such complex mixtures of metal ions may be obtained from a variety of sources including, for example, produced formation water from a subterranean formation, a produced subterranean treatment fluid, industrial process water, or any combination thereof. In more particular embodiments of the present disclosure, the acidic aqueous stream may be obtained from a mining operation. As indicated above, exceedingly complex mixtures of metal ions may be obtained in a mining operation wastewater stream.

In more particular embodiments, the one or more metal ions in the acidic aqueous stream can comprise a metal ion selected from the group consisting of iron, aluminum, manganese, and any combination thereof. In some embodiments, the acidic aqueous stream may comprise all of iron, aluminum, and manganese, optionally in further combination with additional metal ions. Iron, aluminum, and manganese ions can be especially prevalent in mining operation wastewater streams. Other ions that may be present in an acidic aqueous stream, optionally in combination with iron, aluminum and/or manganese ions, include ions such as, for example, nickel, lead, chromium, cobalt, zinc, silver, gold, antimony, arsenic, cadmium, mercury, platinum, molybdenum, and any combination thereof.

In some embodiments, a concentration of each metal ion in the acidic aqueous stream may have a concentration ranging between about 0.01 mg/L and about 500 mg/L. After removal of at least a portion of the metal ions, a concentration of each metal ion in the aqueous stream may be below a target concentration of about 0.01 mg/L, more typically below a target concentration of about 0.005 mg/L. Choice of a target concentration for a given metal ion may be dictated by a number of factors including industrial and environmental regulations. These concentration ranges are merely illustrative and may vary in a particular application. For example, for precious metal contaminants (e.g., gold, silver, platinum, and the like), the aqueous stream concentration may be left higher than 500 mg/L if the precious metal is to be enriched from the aqueous stream. Similarly, the aqueous stream concentration may be made as low as possible if the precious metal contaminant is to be enriched from the flocculated metal salt.

In more particular embodiments, water treatment processes of the present disclosure may comprise: providing an acidic aqueous stream from a mining operation, the acidic aqueous stream comprising one or more metal ions; adjusting a pH of the aqueous stream to a value of about 7 or above by adding thereto a base and an alkaline source of hypochlorous acid, the alkaline source of hypochlorous acid being added after the base has been added and a pH rate of change has been allowed to stabilize to a value of about 0.1 pH units or less per minute; and removing at least a portion of the metal ions from the aqueous stream after adding the base and the alkaline source of hypochlorous acid.

In the processes of the present disclosure, a base is added to the acidic aqueous stream in order to affect a pH increase. In various embodiments, the base may comprise a metal hydroxide, a metal oxide, or any combination thereof. Use of a metal hydroxide or a metal oxide base may result in the formation and precipitation of flocculated metal hydroxide salts from the metal ions present in the acidic aqueous stream. In more particular embodiments, the base used in the water treatment processes of the present disclosure may comprise a lime base such as quick lime (calcium oxide), slaked lime (calcium hydroxide), or any combination thereof. When one or more lime bases are used in the processes of the present disclosure, the lime base may be added to the acidic aqueous stream as an aqueous slurry. Lime bases can be particularly desirable due to their low cost and historical use in water treatment processes, for example. Other insoluble metal oxides, metal hydroxides, or any combination thereof may similarly be added to the acidic aqueous stream as an aqueous slurry. Soluble metal oxide and metal hydroxide bases such as sodium hydroxide or potassium hydroxide, for example, may be added to the acidic aqueous stream in soluble form in an aqueous solution. Alternatively, such soluble metal oxides and metal hydroxides may be added to the acidic aqueous stream in solid form, if desired.

In various embodiments, a concentration of the base or a slurry thereof in an aqueous phase may range between about 5 wt. % and about 25 wt. %. In more particular embodiments, a concentration of the base or a slurry thereof in an aqueous phase may range between about 5 wt. % and about 15 wt. %.

In various embodiments, the alkaline source of hypochlorous acid may comprise an aqueous solution of sodium hypochlorite. For example, commercial bleach solutions having a concentration of about 12.5 wt. % sodium hypochlorite may be used in the embodiments of the present disclosure. Other precursors for hypochlorous acid may also be used in the various embodiments of the present disclosure. Other suitable precursors for forming hypochlorous acid can include, for example, alkaline aqueous solutions of potassium hypochlorite. Potassium hypochlorite may be particularly desirable for treating water destined for agricultural release, where excess sodium can be detrimental to crop growth.

In more particular embodiments, the base may comprise calcium hydroxide, calcium oxide, or any combination thereof, and the alkaline source of hypochlorous acid may comprise an aqueous solution of sodium hypochlorite.

Embodiments disclosed herein include:

A. Water treatment processes. The water treatment processes comprise: providing an acidic aqueous stream comprising one or more metal ions; adding a base to the aqueous stream and increasing its pH to a first pH value; after adding the base and increasing the pH, adding an alkaline source of hypochlorous acid to the aqueous stream and further increasing its pH to a second pH value, the second pH value being about 7 or above; and removing at least a portion of the metal ions from the aqueous stream after adding the base and the alkaline source of hypochlorous acid.

B. Water treatment processes. The water treatment processes comprise: providing an acidic aqueous stream from a mining operation, the acidic aqueous stream comprising one or more metal ions; adjusting a pH of the aqueous stream to a value of about 7 or above by adding thereto a base and an alkaline source of hypochlorous acid, the alkaline source of hypochlorous acid being added after the base has been added and a pH rate of change has been allowed to stabilize to a value of about 0.1 pH units or less per minute; and removing at least a portion of the metal ions from the aqueous stream after adding the base and the alkaline source of hypochlorous acid.

Each of embodiments A and B may have one or more of the following additional elements in any combination:

Element 1: wherein the process further comprises allowing a pH rate of change to stabilize to a value of about 0.1 pH units or less per minute before the alkaline source of hypochlorous acid is added to the aqueous stream.

Element 2: wherein the pH rate of change is allowed to stabilize to a value of about 0.05 pH units or less per minute before the alkaline source of hypochlorous acid is added to the aqueous stream.

Element 3: wherein the process further comprises oxidizing at least a portion of the metal ions at or below the second pH value with hypochlorous acid to form oxidized metal ions.

Element 4: wherein the process further comprises precipitating the oxidized metal ions as a flocculated metal salt, and separating the flocculated metal salt from the aqueous stream.

Element 5: wherein the second pH value is about 7.5 or above.

Element 6: wherein the base comprises a metal hydroxide, a metal oxide, or any combination thereof.

Element 7: wherein the base comprises calcium hydroxide, calcium oxide, or any combination thereof.

Element 8: wherein the alkaline source of hypochlorous acid comprises an aqueous solution of sodium hypochlorite.

Element 9: wherein the acidic aqueous stream is obtained from a mining operation.

Element 10: wherein the one or more metal ions comprise a metal ion selected from the group consisting of iron, aluminum, manganese, and any combination thereof.

Element 11: wherein the process further comprises subjecting the acidic aqueous stream to an electrocoagulation process before adding the base and the alkaline source of hypochlorous acid thereto.

Element 12: wherein the base is added to the acidic aqueous stream as an aqueous slurry.

Element 13: wherein removing at least a portion of the metal ions from the aqueous stream comprises: precipitating at least a portion of the metal ions as a flocculated metal salt; and separating the flocculated metal salt from the aqueous stream.

Element 14: wherein the process further comprises oxidizing at least a portion of the metal ions with hypochlorous acid to form oxidized metal ions; wherein the oxidized metal ions are precipitated as the flocculated metal salt.

Element 15: wherein the base comprises calcium hydroxide, calcium oxide, or any combination thereof, and the alkaline source of hypochlorous acid comprises an aqueous solution of sodium hypochlorite.

Element 16: wherein the process further comprises subjecting the acidic aqueous stream to an electrocoagulation process before adding the base and the alkaline source of hypochlorous acid thereto.

By way of non-limiting example, exemplary combinations applicable to A and B include:

The process of A in combination with elements 1 and 3.
The process of A in combination with elements 3 and 4.
The process of A in combination with elements 1 and 5.
The process of A in combination with elements 3 and 7.
The process of A in combination with elements 7 and 8.
The process of A in combination with elements 9 and 10.
The process of A in combination with elements 7, 9 and 10.
The process of A in combination with elements 8, 9 and 10.
The process of A in combination with elements 13 and 14.
The process of A in combination with elements 14 and 15.
The process of B in combination with elements 3 and 4.
The process of B in combination with elements 4 and 7.
The process of B in combination with elements 10 and 11.
The process of B in combination with elements 13 and 14.
The process of B in combination with elements 15 and 16.
The process of B in combination with elements 14, 15 and 16.

To facilitate a better understanding of the embodiments of the present disclosure, the following examples of preferred or representative embodiments are given. In no way should the following examples be read to limit, or to define, the scope of the disclosure.

EXAMPLES

Example 1: A sample of an acidic waste stream from a mining operation was obtained and subjected to an electrocoagulation process. Thereafter, the sample was split into 8 equal aliquots (1 L) and treated as specified in Table 1 below using a 10 wt. % aqueous slurry of calcium hydroxide and a 12.5 wt. % alkaline aqueous solution of sodium hypochlorite. A peak pH of 8.2 was targeted based upon the volume of the acidic waste stream aliquot and its initial pH. The amounts of calcium hydroxide slurry and sodium hypochlorite solution were those calculated to attain the target pH, assuming no interference from the metal ions in the waste stream.

TABLE 1

| | Entry | | | | | | | |
|---|---|---|---|---|---|---|---|---|
| | 1 | 2 | 3 | 4 | 5 | 6 | 7 | 8 |
| Ca(OH)$_2$ conc. (g/L)[1] | 0.10 | 0.12 | 0.12 | 0.12 | 0.12 | 0.13 | 0.12 | 0.12 |
| NaOCl conc. (mL/L)[2] | 0.31 | 0.31 | 0.31 | 0.31 | 0.31 | 0.31 | 0.31 | 0.31 |
| Initial pH | 3.53[3] | 3.53[3] | 3.45[3] | 3.45[3] | 3.43[3] | 3.40[3] | 3.48[5] | 3.49[6] |
| pH at 1 min. | 5.60 | 6.60 | 6.14 | 6.30 | 6.48 | 6.68 | 7.44 | 3.96[7] |
| pH at 2 min. | 5.80 | 7.12 | 6.62[4] | 6.72 | 6.74 | 7.18 | 7.32 | 7.10 |
| pH at 3 min. | 6.00 | 7.35 | | 6.96 | 7.01 | 7.48 | 7.12 | 7.22 |
| pH at 4 min. | 6.05 | 7.49 | | 7.11 | 7.15 | 7.69 | 6.93 | 7.10 |
| pH at 5 min. | 6.10 | 7.60 | | 7.21 | 7.25 | 7.82 | 6.78 | 6.95 |
| pH at 6 min. | 6.14 | 7.66 | | 7.29 | 7.32 | 7.91 | 6.66 | |
| pH at 7 min. | 6.16[4] | 7.71[4] | | 7.35 | 7.41 | 7.97 | 6.54 | |
| pH at 8 min. | | | | 7.39[4] | 7.45[4] | 8.01[4] | | |
| pH after adding NaOCl soln. | 7.4 | 8.11 | 7.42 | 7.74 | 7.96 | 8.2 | | |

[1]Concentration of solid Ca(OH)$_2$ in treated waste stream.
[2]Concentraton of 12.5% NaOCl solution in treated waste stream.
[3]Indicates time at which Ca(OH)$_2$ slurry was added to waste stream.
[4]Indicates time at which 12.5% NaOCl solution was added to the waste stream following Ca(OH)$_2$ slurry.
[5]Indicates time at which Ca(OH)$_2$ slurry and 12.5% NaOCl solution were added to the waste stream together.
[6]Indicates time at which 12.5% NaOCl solution was added to the waste stream.
[7]Indicates time at which Ca(OH)$_2$ slurry was added to the waste stream following the 12.5% NaOCl solution.

As shown in Table 1, higher maximum pH values were generally obtained when the lime base was added to the waste stream prior to the 12.5% sodium hypochlorite solution (comparing entries 2-5 versus entries 7 and 8). When the lime base and sodium hypochlorite solution were added concurrently (entry 7) or in the reverse order (entry 8), a smaller pH rise was observed for the same quantities of chemicals. The peak pH was higher when the addition of the sodium hypochlorite solution was delayed until the pH rise had approached a plateau value (entries 2, 4 and 5 versus entry 3). By only slightly increasing the effective Ca(OH)$_2$ concentration (entry 6), the target pH of 8.2 or above was achieved.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A water treatment process comprising:
   flowing an acidic aqueous stream comprising one or more metal ions, wherein a concentration of each metal ion in the aqueous stream ranges from 0.01 milligrams per liter (mg/L) to 500 mg/L;
   adding a base concentration to the aqueous stream at a first location and increasing a first pH value of the aqueous stream;
   adding an alkaline source of hypochlorous acid to the aqueous stream at a second location after the base and the aqueous stream have reached thermal equilibrium and after the first pH value approaches a plateau value wherein a pH rate of change stabilizes to a value of about 0.1 pH units or less per minute, the second location being downstream of the first location;
   increasing the base concentration of the aqueous stream, and further increasing the first pH value to a second pH value, the second pH value being about 7 or above;
   oxidizing at least a portion of the metal ions in the aqueous stream and forming a flocculated metal salt, wherein the flocculated metal salt comprises a Lewis acid-base complex flocculated material;
   separating at least a portion of the flocculated metal salt from the aqueous stream, wherein the separating comprises at least one of cross-flow filtration or hydrocyclone separation; and
   providing a filtered aqueous stream, wherein a concentration of each metal ion in the filtered aqueous stream is less than 0.005 mg/L.

2. The water treatment process of claim 1, wherein the pH rate of change is allowed to stabilize to a value of about 0.05 pH units or less per minute before the alkaline source of hypochlorous acid is added to the aqueous stream.

3. The water treatment process of claim 1, wherein the second pH value is about 7.5 or above.

4. The water treatment process of claim 1, wherein the base comprises a metal hydroxide, a metal oxide, or any combination thereof.

5. The water treatment process of claim 4, wherein the base comprises calcium hydroxide, calcium oxide, or any combination thereof.

6. The water treatment process of claim 1, wherein the alkaline source of hypochlorous acid comprises an aqueous solution of sodium hypochlorite.

7. The water treatment process of claim 1, wherein the acidic aqueous stream is obtained from a mining operation.

8. The water treatment process of claim 1, wherein the one or more metal ions comprise a metal ion selected from the group consisting of iron, aluminum, manganese, and any combination thereof.

9. The water treatment process of claim 1, further comprising:
   subjecting the acidic aqueous stream to an electrocoagulation process before adding the base and the alkaline source of hypochlorous acid thereto.

10. The water treatment process of 1, wherein the base is added to the acidic aqueous stream as an aqueous slurry.

11. A water treatment process comprising:
    flowing an acidic aqueous stream from a mining operation, the acidic aqueous stream comprising one or more metal ions, wherein a concentration of each metal ion in the aqueous stream ranges from 0.01 milligrams per liter (mg/L) to 500 mg/L;
    adjusting a first pH value of the aqueous stream to a value of about 7 or above by adding thereto a base concentration at a first location and an alkaline source of hypochlorous acid at a second location after the base concentration and the aqueous stream have reached thermal equilibrium, the second location being downstream of the first location, the alkaline source of hypochlorous acid being added after the base has been added and a pH rate of change has been allowed to stabilize to a value of about 0.1 pH units or less per minute, then increasing the base concentration of the aqueous stream;
    oxidizing at least a portion of the metal ions in the aqueous stream and forming a flocculated metal salt, wherein the flocculated metal salt comprises a Lewis acid-base complex flocculated material;
    separating at least a portion of the flocculated metal salt from the aqueous stream, wherein the separating comprises at least one of cross-flow filtration or hydrocyclone separation; and providing a filtered aqueous stream, wherein a concentration of each metal ion in the filtered aqueous stream is less than 0.005 mg/L.

12. The water treatment process of claim 11, wherein the pH rate of change is allowed to stabilize to a value of about 0.05 pH units or less per minute before the alkaline source of hypochlorous acid is added to the aqueous stream.

13. The water treatment process of claim 11, further comprising:
precipitating at least a portion of the metal ions as a flocculated metal salt;
separating the flocculated metal salt from the aqueous stream, wherein the separating comprises hydrocyclone separation.

14. The water treatment process of claim 11, wherein the base comprises calcium hydroxide, calcium oxide, or any combination thereof, and the alkaline source of hypochlorous acid comprises an aqueous solution of sodium hypochlorite.

15. The water treatment process of claim 14, wherein the base is added to the acidic aqueous stream as an aqueous slurry.

16. The water treatment process of claim 11, wherein the one or more metal ions comprise a metal ion selected from the group consisting of iron, aluminum, manganese, and any combination thereof.

17. The water treatment process of claim 11, further comprising:
subjecting the acidic aqueous stream to an electrocoagulation process before adding the base and the alkaline source of hypochlorous acid thereto.

18. The water treatment process of claim 1, further comprising measuring a pH of the aqueous stream at a location downstream of the first location and performing at least one of varying a flow rate of the aqueous stream based on the measured pH or varying the second location based on the measured pH.

19. The water treatment process of claim 11, further comprising measuring a pH of the aqueous stream at a location downstream of the first location and performing at least one of varying a flow rate of the aqueous stream based on the measured pH or varying the second location based on the measured pH.

20. The water treatment process of claim 1, wherein the flocculated metal is an ionic flocculated metal salt selected from the group consisting of hydroxides, carbonates, and combinations thereof.

* * * * *